United States Patent
Doza et al.

(10) Patent No.: US 6,458,732 B1
(45) Date of Patent: Oct. 1, 2002

(54) LIGHTWEIGHT DRY REFRACTORY

(75) Inventors: Douglas K. Doza, Hilliard; John Y. Liu, Upper Arlington, both of OH (US)

(73) Assignee: Allied Mineral Products, Inc., Columbus, OH (US)

(*) Notice: Subject to any disclaimer, the term of this patent is extended or adjusted under 35 U.S.C. 154(b) by 0 days.

(21) Appl. No.: 09/326,722

(22) Filed: Jun. 7, 1999

(51) Int. Cl.$^7$ .................. C04B 35/00; C04B 35/66
(52) U.S. Cl. .............. 501/94; 501/96.4; 501/96.1; 501/97.1; 501/97.2; 501/97.3; 501/98.4; 501/92; 501/98.5; 501/102; 501/106; 501/107; 501/108; 501/109; 501/119; 501/120; 501/122; 501/118; 501/123; 501/124; 501/125; 501/127; 501/128; 501/129; 501/130; 501/126; 501/96.3; 501/98.1; 501/111; 501/87; 501/88; 501/89; 264/30; 264/31
(58) Field of Search .................. 501/88, 95.1, 89, 501/96.4, 96.1, 97.1, 97.2, 97.3, 98.4, 98.5, 92, 102, 94, 105, 106, 107, 108, 109, 119, 120, 118, 122, 87, 123, 124, 125, 127, 128, 129, 130, 126, 96.3, 98.1, 171, 134, 135; 264/30, 31, 269

(56) References Cited

U.S. PATENT DOCUMENTS

| | | | | |
|---|---|---|---|---|
| 3,933,513 A | * | 1/1976 | Mellows | 501/129 |
| 4,221,595 A | * | 9/1980 | Zebrowski | 501/100 |
| 4,432,799 A | * | 2/1984 | Salazar | 501/111 |
| 4,495,301 A | * | 1/1985 | Sutor | 501/127 |
| 4,514,531 A | * | 4/1985 | Kleeb et al. | 501/127 |
| 4,874,726 A | * | 10/1989 | Kleeb et al. | 501/124 |
| 5,252,526 A | * | 10/1993 | Whittmore | 501/127 |
| 5,302,563 A | * | 4/1994 | Rumpeltin et al. | 501/127 |
| 5,603,759 A | * | 2/1997 | Burkhart | 501/124 |
| 5,744,413 A | * | 4/1998 | Cortellini | 501/128 |

* cited by examiner

Primary Examiner—Michael Marcheschi
(74) Attorney, Agent, or Firm—Porter Wright Morris & Arthur LLP

(57) ABSTRACT

A dry refractory composition having superior insulating value. The dry refractory composition also may have excellent resistance to molten metals and slags. The composition includes filler lightweight material, which may be selected from perlite, vermiculite, expanded shale, expanded fireclay, expanded alumina silica hollow spheres, bubble alumina, sintered porous alumina, alumina spinel insulating aggregate, calcium alumina insulating aggregate, expanded mulllite, cordierite, and anorthite, and matrix material, which may be selected from calcined alumina, fused alumina, sintered magnesia, fused magnesia, silica fume, fused silica, silicon carbide, boron carbide, titanium diboride, zirconium boride, boron nitride, aluminum nitride, silicon nitride, Sialon, titanium oxide, barium sulfate, zircon, a sillimanite group mineral, pyrophyllite, fireclay, carbon, and calcium fluoride. The composition also may include dense refractory aggregate, which may be selected from calcined fireclay, calcined Chamotte, a sillimanite group mineral, calcined bauxite, pyrophyllite, silica, zircon, baddeleyite, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, and fused spinel refractory grog, a heat activated bonding agent, and a dust suppressant.

18 Claims, No Drawings

LIGHTWEIGHT DRY REFRACTORY

BACKGROUND OF THE INVENTION

This invention relates to a dry refractory (i.e., a monolithic refractory installed in dry powder form without the addition of water or liquid chemical binders), particularly a lightweight dry refractory with superior thermal insulation qualities.

Refractories are used as working linings of metal processing and transfer vessels to contain molten metal and slag and the associated heat and gases. These linings typically are consumable materials that are eroded or otherwise damaged by exposure to the conditions within the vessel. When a certain amount of consumption of or damage to the lining has occurred, metal processing must be halted—sometimes for an extended time—in order to repair or replace the refractory lining. The frequency of these interruptions is determined by the rate at which the process consumes the lining. The duration of these interruptions is dependent on the consumption rate and whether it is possible to repair localized damage to the lining without removing the undamaged portions and replacing the entire lining.

Refractories also are used as secondary or backup linings of vessel working linings. Although these secondary linings are not exposed to molten metals or slags under ideal operating conditions, they must be capable of containing molten metals and slags that penetrate the working lining as a result of erosion, crack formation, or other damage.

Refractories also are used to insulate vessels and other structures used in metal processing and other operations carried out at elevated temperatures. These refractories generally are selected for their heat containment capabilities rather than their resistance to molten metals and slags.

Factors important in refractory selection include the operating conditions of the application, speed and ease of installation and repair, insulating value, and cost. The operating conditions include the predicted chemical and thermal environment to which the refractory will be exposed. For molten metal containment applications, the chemical and thermal environment may be affected by (1) the boundary conditions relating to the dimensions of the shell and the desired capacity of the molten metal pool, (2) the identity and physical properties of the metal, and (3) the expected operating environment of the vessel, including its rated capacity and the presence of features such as oxygen injection, plasma torches, and water or air cooling devices.

Refractories typically are available in the form of bricks, blocks, refractory plastics, ramming masses, refractory castables and dry refractories. Installation and repair of brick and block linings are likely to be costly and slow. Bricks and blocks also must be assembled to avoid gaps at the joints, a time-consuming task requiring skilled craftsmen. Even when the bricks and blocks are carefully fitted together, gaps remain which may allow molten metals and slags to penetrate the lining. Refractory bricks and blocks may have a short life (high consumption rate) and may require removal and replacement of the entire lining when only a portion of the lining is eroded or damaged. This increases the cost of repair and greatly increases downtime.

Conventional refractory plastics and ramming mixes also may have a high consumption rate and may require removal and replacement of the entire lining when only a portion of the lining is eroded or damaged. Castable refractories potentially have a longer life (lower consumption rate) and lower operating and maintenance costs when compared to the prior lining materials. These materials offer the potential for longer life and easier, faster, less expensive installation and maintenance when compared to lining materials typically applied. For example, damaged portions of a castable lining generally can be repaired without removal and replacement of the entire lining.

Installation of a castable refractory lining requires onsite mixing with the attendant mixing equipment, water source, skilled labor and supervision costs, and risk of mixing errors. The quality of the castable lining depends, among other things, on the casting water added, the mixing and vibration techniques used, and the skill of the installers. Transporting the mixed wet castables to the job site may be time consuming, awkward and inconvenient. Installation may require forming, which increases installation time and cost. Dryout of a castable lining at elevated temperatures is needed to remove the added moisture before the lining can be cured and placed into service. Heating of the castable refractory during dryout also increases energy costs.

Conventional refractories and castable refractories are prone to crack formation. Some cracks that form can extend completely through the lining from the hot face (molten metal side) to the cold face (steel shell side). When cracks of this nature occur, the possibility of molten metal and/or slag penetrating via these cracks to an outer shell of the vessel exists. When this occurs, the molten materials can burn through the shell, which may result in extensive damage to equipment and/or injury to personnel. A burnthrough of this type can cause long, unscheduled delays in the operation to make repairs to the lining, steel shell and structure, and any surrounding equipment.

Dry refractories are unbonded monolithic materials that are capable of forming strong ceramic bonds at a controlled rate in predetermined temperature ranges and do not contain water or liquid chemical binders. They typically are installed by vibrating, compacting or otherwise de-airing the free-flowing material without addition of water or liquid chemical binders. Dry refractories are easy to install and repair because no mixing is required. Installation of dry refractories is faster and less expensive than installation of castable refractories. In addition to the absence of a mixing step, vessel downtime is reduced because dryout of the lining is not required before a new or repaired lining is placed into service.

The chemical and mineralogical composition of dry refractories can be chosen to be resistant to the specific types and temperatures of metals and slags inherent to a metal containment process. In particular, the refractory can be designed to form strong ceramic bonds in predetermined temperature ranges and at controlled rates of formation. Progressive bond formation, which is influenced by time, temperature, and atmosphere, occurs in response to operating conditions in the immediate environment of the composition. Regions exposed to temperatures above the activation temperature of the bonding agent form strong ceramic bonds while regions exposed to lower temperatures form fewer and weaker bonds.

When ceramic bonding of properly selected dry refractories occurs in this manner, the bonded portion of the material becomes dense and hard and is chemically and physically resistant to penetration of both molten metal and slag. Any portion of the dry refractory that remains below the critical temperature for the formation of ceramic bonds remains as an unbonded monolithic material that does not exhibit brittle behavior or cracking tendencies. The presence of a region of unbonded refractory under normal operating conditions provides improved absorption of mechanical stresses, which may extend the operating life of the vessel lining. Progressively bonding dry refractories have excellent resistance to crack propagation because they can form a barrier to any molten metal and slag that penetrates through the bonded region of the refractory and into the unbonded or fluid region.

For example, a dry refractory may be selected so that regions adjacent to the heat source (e.g., a hot face of a process vessel or an intrusion of molten metal and slag into the refractory lining) form strong ceramic bonds and regions furthest from the heat source remain in an unbonded fluid state until the temperature exceeds the critical temperature, with partial bonding in the intermediate regions. The rigid bonded refractory is chemically and physically resistant to penetration of both molten metal and slag. The unbonded dry refractory exhibits fluid properties that enable it to absorb and distribute local stresses without formation of cracks but is capable of forming strong ceramic bonds upon exposure to more severe operating conditions, e.g., the penetration of molten metal or slag through the bonded portion of the lining.

Refractories with greater insulating capabilities are in demand to conserve energy and reduce energy-related costs in metal processing and similar operations. Although all refractories have some insulating value, so-called insulating refractories (refractories with greater insulating value than typical refractories), such as insulating castable refractories, insulating refractory gunning mixes, and insulating moldable refractories, generally include moisture or liquid chemical binders in their as-installed state before dryout. They also typically have an open porosity that provides low resistance to molten metals and slags. Conventional dry vibratable refractories have excellent resistance to molten metals and are able to absorb mechanical stresses, but large quantities (weights) of material are necessary to form the thick walls typically required to achieve a desired insulating value.

In view of the disadvantages of the prior art, a need exists for a dry refractory that is easy to install, reduces downtime, and provides superior insulating value.

It is an object of the invention to provide a dry refractory with insulating value at least as good as insulating brick and insulating castable refractories with faster installation in similar applications. It is a further object of the invention to provide such a dry refractory with greater resistance to molten metal and slag than conventional insulating refractories.

It is another object of the invention to provide an insulating refractory that does not contain and can be installed without the addition of moisture or liquid chemical binders such that the downtime associated with installation can be reduced.

It is yet another object of the invention to provide an insulating refractory that responds to changing thermal conditions after installation.

It is still another object of the invention to provide a dry refractory that combines the molten metal resistance and stress relief of conventional dry vibratable refractories with superior insulating value. It is a further object of the invention to provide such superior insulating value in a dry refractory of lighter weight than conventional dry vibratable refractories.

SUMMARY OF THE INVENTION

The foregoing objects are achieved in a dry refractory composition including filler lightweight material and matrix material. The composition also may include a dense refractory aggregate, a dust suppressant, a bonding agent, or a combination of these.

The filler lightweight material is an insulating refractory material. Preferably, the insulating refractory material is selected from perlite, vermiculite, expanded shale, expanded fireclay, expanded alumina silica hollow spheres, bubble alumina, sintered porous alumina, alumina spinel insulating aggregate, calcium alumina insulating aggregate, expanded mulllite, cordierite, and anorthite.

The matrix material is a fine granular refractory material. Preferably the fine granular refractory material is selected from calcined alumina, fused alumina, sintered magnesia, fused magnesia, silica fume, fused silica, silicon carbide, boron carbide, titanium diboride, zirconium boride, boron nitride, aluminum nitride, silicon nitride, Sialon, titanium oxide, barium sulfate, zircon, a sillimanite group mineral, pyrophyllite, fireclay, carbon, and calcium fluoride.

The composition also may include a dense refractory aggregate, which may be selected from calcined fireclay, calcined Chamotte, a sillimanite group mineral, calcined bauxite, pyrophyllite, silica, zircon, baddeleyite, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, and fused spinel refractory grog. During installation, the composition contains only incidental moisture, i.e., less than about 1 percent by weight water. The filler lightweight material may be present in an amount from about 15 to 85 volume percent, the matrix material in an amount from about 5 to 50 volume percent, and the dense refractory aggregate in an amount from about 0.1 to 40 volume percent. The composition also may include a dust suppressant in an amount from about 0.1 to 3 volume percent or a bonding agent in an amount from about 0.1 to 15 volume percent.

The composition may form bonds in response to changing thermal conditions. This bond formation may be accomplished by high temperature ceramic bonding of the filler lightweight material, matrix material, and dense refractory material upon exposure to a predetermined temperature range.

Preferably, the composition progressively forms strong ceramic bonds upon exposure to temperatures in predetermined ranges. For example, a first portion of the composition may form strong ceramic bonds upon exposure to temperatures in a first predetermined range and a second portion of the composition may remain in an unbonded fluid form upon exposure to temperatures in a second predetermined range.

The bonding agent, which may be heat activated, preferably is nonliquid at room temperature. The bonding agent may be an organic bonding agent selected from phenolic resin, furan resin, and pitch or an inorganic bonding agent selected from boron oxide, boric acid, cryolite, a fluoride salt, a silicate compound, a phosphate compound, calcium silicate cement, calcium aluminate cement, boron carbide, Sialon, fluorspar, magnesium chloride, fireclay, ball clay, kaolin, and refractory frit. The dust suppressant may be selected from lightweight oil, kerosene, and organic polymer.

In a preferred embodiment, the refractory composition may include filler lightweight material in an amount from about 15 to 85 volume percent, matrix material in an amount from about 5 to 50 volume percent, dense refractory aggregate in an amount from about 0.1 to 80 volume percent, a heat activated bonding agent an amount from about 0.1 to 15 volume percent, and a dust suppressant in an amount from about 0.1 to 3 volume percent. More preferably, the filler lightweight material may be present in an amount from about 50 to 80 volume percent, the matrix material in an amount from about 10 to 30 volume percent, the dense refractory aggregate in an amount from about 0.1 to 40 volume percent, the heat activated bonding agent in an amount from about 0.1 to 10 volume percent, and the dust suppressant in an amount from about 0.25 to 1.6 volume percent.

In another preferred embodiment, the refractory composition may include filler lightweight material in an amount sufficient to achieve a predetermined insulating value and matrix material in an amount sufficient to achieve good resistance to a predetermined chemical and thermal environment. The composition also may include dense refractory aggregate in an amount sufficient to maintain the structural integrity of the composition in the predetermined chemical and thermal environment, a dust suppressant in an amount sufficient to control visible and respirable dust during installation of the composition in dry powder form, or a heat activated bonding agent in an amount sufficient to form strong bonds within the composition.

The present invention also includes a refractory composition including the following ingredients in approximate percent by volume:

| Ingredient | Percent by Volume |
| --- | --- |
| filler lightweight material | 15 to 85 |
| matrix material | 5 to 50 |
| heat activated bonding agent | 0 to 15 |
| dense refractory aggregate | 0 to 80 |
| dust suppressant | 0 to 3. |

More preferably, the composition includes the following ingredients in approximate percent by volume:

| Ingredient | Percent by Volume |
| --- | --- |
| filler lightweight material | 50 to 80 |
| matrix material | 10 to 30 |
| heat activated bonding agent | 0 to 10 |
| dense refractory aggregate | 0 to 40 |
| dust suppressant | 0.25 to 1.6. |

The present invention includes a refractory composition including filler lightweight material in an amount from about 15 to 85 volume percent selected from perlite, vermiculite, expanded shale, expanded fireclay, expanded alumina silica hollow spheres, bubble alumina, sintered porous alumina, alumina spinel insulating aggregate, calcium alumina insulating aggregate, expanded mullite, cordierite, anorthite, and insulating refractory material; and matrix material in an amount from about 5 to 50 volume percent selected from calcined alumina, fused alumina, sintered magnesia, fused magnesia, silica fume, fused silica, silicon carbide, boron carbide, titanium diboride, zirconium boride, boron nitride, aluminum nitride, silicon nitride, Sialon, titanium oxide, barium sulfate, zircon, a sillimanite group mineral, pyrophyllite, fireclay, carbon, calcium fluoride, and a fine granular refractory material capable of imparting chemical and thermal resistance to the composition. The composition further may include dense refractory aggregate in an amount from about 0.1 to 80 volume percent selected from calcined fireclay, calcined Chamotte, a sillimanite group mineral, calcined bauxite, pyrophyllite, silica, zircon, baddeleyite, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, and fused spinel refractory grog; a dust suppressant in an amount from about 0.2 to 3 volume percent selected from lightweight oil, kerosene, and organic polymer; or a heat activated bonding agent in an amount from about 0.1 to 15 volume percent selected from boron oxide, boric acid, cryolite, a fluoride salt, a silicate compound, a phosphate compound, calcium silicate cement, calcium aluminate cement, boron carbide, Sialon, fluorspar, magnesium chloride, fireclay, ball clay, kaolin, refractory frit, phenolic resin, furan resin, and pitch.

In another embodiment of the invention, an installed refractory composition may include filler lightweight material and matrix material, with the composition being substantially free from water and liquid chemical binders during and immediately after installation. At least a portion of the installed refractory may retain fluid properties to relieve mechanical stresses.

The present invention also provides a method of making a refractory composition, including the steps of:

selecting filler lightweight material from perlite, vermiculite, expanded shale, expanded fireclay, expanded alumina silica hollow spheres, bubble alumina, sintered porous alumina, alumina spinel insulating aggregate, calcium alumina insulating aggregate, expanded mullite, cordierite, anorthite, and insulating refractory aggregate;

selecting matrix material from calcined alumina, fused alumina, sintered magnesia, fused magnesia, silica fume, fused silica, silicon carbide, boron carbide, titanium diboride, zirconium boride, boron nitride, aluminum nitride, silicon nitride, Sialon, titanium oxide, barium sulfate, zircon, a sillimanite group mineral, pyrophyllite, fireclay, carbon, calcium fluoride, and fine granular refractory aggregate capable of imparting chemical and thermal resistance to the composition; and blending the selected filler lightweight material in an amount sufficient to achieve a desired insulating value with an amount of matrix material sufficient to achieve good resistance to a predetermined chemical and thermal environment. The blending step preferably is carried out in the absence of added water or liquid chemical binders.

The method also may include the steps of selecting a dense refractory aggregate from calcined fireclay, calcined Chamotte, a sillimanite group mineral, calcined bauxite, pyrophyllite, silica, zircon, baddeleyite, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, and fused spinel refractory grog, and adding the dense refractory aggregate in an amount sufficient to maintain the structural integrity of the composition in the predetermined chemical and thermal environment. In addition, the method may include the steps of selecting a dust suppressant and adding the dust suppressant to the composition in an amount sufficient to control visible and respirable dust during installation.

The invention further provides a method of installing an insulating refractory lining, including the steps of selecting an insulating refractory composition in powder form, pouring the dry powdered composition into a void, and de-airing the powdered composition. The de-airing step may include the step of compacting the composition. The step of selecting an insulating refractory may include the step of selecting a refractory composition. This composition may include filler lightweight material selected from perlite, vermiculite, expanded shale, expanded fireclay, expanded alumina silica hollow spheres, bubble alumina, sintered porous alumina, alumina spinel insulating aggregate, calcium alumina insulating aggregate, expanded mullite, cordierite, and anorthite; matrix material selected from calcined alumina, fused alumina, sintered magnesia, fused magnesia, silica fume, fused silica, silicon carbide, boron carbide, titanium diboride, zirconium boride, boron nitride, aluminum nitride, silicon nitride, Sialon, titanium oxide, barium sulfate, zircon, a sillimanite group mineral, pyrophyllite, fireclay, carbon, and calcium fluoride; and a dust suppressant. The composition also may be selected to include dense refractory aggregate selected from calcined fireclay, calcined Chamotte, a sillimanite group mineral, calcined bauxite, pyrophyllite, silica, zircon, baddeleyite, cordierite, silicon carbide, sintered alumina, fused alumina, fused silica, sintered mullite, fused mullite, fused zirconia, sintered zirconia mullite, fused zirconia mullite, sintered magnesia, fused magnesia, sintered spinel, and fused spinel refractory grog, alone or in combination with a heat activated bonding agent.

One embodiment of the present invention is useful primarily in insulating or heat containment applications, although it also may be suitable for containment of less corrosive metals such as copper or aluminum. Denser (but still lightweight compared to conventional refractories), more corrosion resistant refractories of the present invention are suitable for containment of more corrosive molten metals such as iron and steel.

These and further objects of the invention will become apparent from the following detailed description.

DETAILED DESCRIPTION OF THE PREFERRED EMBODIMENT(S)

The composition of the present invention is a monolithic refractory installed in dry powder form without the addition of water or liquid chemical binders. The composition includes filler lightweight material and matrix material. The filler lightweight material contributes to the insulating value of the composition and the matrix material contributes provides good resistance to the chemical and thermal environment in which the composition will be used. Preferably, the composition also includes dense refractory aggregate that contributes to the structural integrity of the composition. The composition also may include a dust suppressant to control visible and respirable dust during installation of the composition in dry powder form and a bonding agent to promote formation of strong bonds within the composition.

The filler lightweight material comprises an insulating refractory aggregate that reduces the density of the composition. The insulating refractory aggregate may be a natural or synthetic material, most typically a refractory oxide. The insulating refractory aggregate may be selected from perlite, vermiculite, expanded shale (e.g, K T 200 and K T 500, available from K T Pumice, Inc.), expanded fireclay (e.g., CE Mulcoa 47LW available from Combustion Engineering and Whi-Agg Low Iron Aggregate available from Whitfield & Son Ltd.), expanded alumina silica hollow spheres (e.g., Fillite Hollow Ceramic Microspheres available from Trelleborg Fillite, Inc. and H-W Greenlite Aggregate available from Harbison-Walker), bubble alumina, sintered porous alumina (e.g., alumina catalyst), alumina spinel insulating aggregate (e.g., H-W Plasmal-90 available from Harbison Walker), calcium alumina insulating aggregate (e.g., Alcoa superlightweight aggregate SLA-92), expanded mullite, cordierite, and anorthite. Other insulating refractory aggregates or porous minerals (including synthetically expanded minerals) known in the art also may be used. A combination of filler lightweight refractories may be used if desired.

Filler lightweight material typically has a particle size of about ⅜ inch or less. The filler lightweight aggregate is present in an amount from about 15 to 85 volume percent, preferably about 50 to 80 volume percent.

The characteristics of the filler lightweight material may vary with the application. In some applications, for example, the filler lightweight material may be selected for low cost while in other applications the material may be selected for resistance to molten metal or other qualities that affect lining performance. For metal containment applications, the filler preferably has properties compatible with the metal, such as alumina spinel insulating aggregate in iron containment applications.

Filler lightweight material having micro pore sizes generally is preferred for molten metal containment and other demanding applications because it is easier to form bonds around the material, resulting in a stronger bond framework. Filler lightweight materials having micro pore sizes also have higher insulating values.

The matrix material is selected to enhance performance of the composition in a particular service environment. Different matrix materials would be used in refractories intended for use in iron melting, steel melting, and copper and aluminum molten metal containment. The matrix material is a natural or synthetic fine granular refractory capable of imparting good chemical and thermal resistance to the composition. Suitable matrix materials may include silicates, alumina-containing refractories, alumina silicates, and alkaline earth aluminum silicates. Preferably, the matrix material is selected from calcined alumina, fused alumina, sintered magnesia, fused magnesia, silica fume, fused silica, silicon carbide, boron carbide, titanium diboride, zirconium boride, boron nitride, aluminum nitride, silicon nitride, Sialon (silicon-aluminum oxynitride), titanium oxide, barium sulfate, zircon, a sillimanite group mineral, pyrophyllite, fireclay, carbon, calcium fluoride, and other matrix materials known in the art. A combination of matrix materials may be used if desired.

The matrix material type and particle size selected may depend on the application, with more economical material being selected to maintain volume stability for nonmetal containment applications. Typically, the matrix material has a particle size of less than about 100 mesh, more preferably less than about 65 mesh, although other particle sizes may be used. Coarser matrix material tends to be more conductive, which may diminish the insulating value of the composition. The matrix material is present in an amount from about 5 to 50 volume percent, preferably about 10 to 30 volume percent.

The composition may contain a substance that functions as a heat activated bonding agent to control material strength and bond development after heat is applied to the installed refractory composition. The bonding agent may be selected based on the temperatures to which the application will be exposed, such that bonding may be substantially complete at temperatures as low as about 350° F. to as high as 1800° F. or more. Heat activated bonding may be accomplished by the action of a discrete bonding agent. Preferably, the bonding agent is nonliquid at room temperature, although addition of an atomized liquid bonding agent during preparation of the composition (not during installation) also may yield acceptable results. When used, the bonding agent typically is present in an amount from about 0.1 to 15 volume percent, preferably about 0.1 to 10 volume percent.

Heat activated bonding also may be accomplished by high temperature ceramic bonding of the filler, matrix, and any dense refractory aggregates in response to the thermal environment of the installed composition. For example, ceramic bonding of the filler, matrix and dense refractory aggregates may provide sufficient bonding in applications such as those in which bond formation is not desired until the composition reaches about 2000° F. or more. Accordingly, the presence of a discrete bonding agent is not necessary to the successful performance of the dry refractory of the present invention.

For applications in which a discrete heat activated bonding agent is used, the bonding agent may be an organic bonding agent, an inorganic bonding agent, or any combination of these. Organic bonding agents, which typically are used for temperatures below about 600° F., develop strength during heating within the temperature range. Phenolic (phenol-formaldehyde) resin including novolac resin (a dry thermosetting phenol-formaldehyde resin) is a preferred organic bonding agent. Low phenol resins are particularly preferred. Other suitable organic bonding agents include furan resin and pitch.

Inorganic bonding agents typically are used for bond development at temperatures greater than about 600° F. They promote the formation of glassy bonds at intermediate temperature ranges and ceramic bonds at higher temperature ranges. Suitable inorganic bonding agents include boron oxide, boric acid, cryolite, a fluoride salt (e.g., aluminum fluoride or magnesium fluoride), a silicate compound (e.g., sodium silicate or potassium silicate), a phosphate compound (e.g., dry orthophosphate powder), calcium silicate cement, calcium aluminate cement, boron carbide, Sialon (silicon-aluminum oxynitride), fluorspar, magnesium chloride, fireclay, ball clay, kaolin, and refractory frit. Other agents recognized in the art as heat activated bonding agents also may be used. As described above, ceramic bonding of the filler, matrix and any dense refractory aggregates also may accomplish the function of a bonding agent in the absence of (or in addition to) a discrete bonding agent.

Boron oxide and boric acid are particularly preferred bonding agents because they are effective and inexpensive. Refractory frit (particle size typically less than about 200 mesh) also is a suitable inorganic bonding agent. Low melting frits are preferred for applications requiring low temperature bonding and high melting frits are preferred for applications with higher service temperature limits.

The particle size of the bonding agents typically is less than about 100 mesh, more preferably less than about 60 mesh. Finer particles provide better dispersion but coarser particles may be more available or available at lower cost.

The composition may include dense refractory aggregate, depending on the application and the characteristics of the filler and matrix material. Dense refractory aggregate typically is present in compositions that will be exposed to corrosive molten metals such as iron and steel, although it also may be present in refractories intended primarily for heat containment. The dense refractory aggregate may include natural or synthetic minerals, or a combination of the two. Natural minerals may include calcined fireclay, calcined Chamotte, a sillimanite group mineral, calcined bauxite, pyrophyllite, silica, zircon and baddeleyite. Synthetic minerals may include cordierite, silicon carbide, sintered alumina (e.g., tabular alumina), fused alumina, fused silica, sintered mullite, fused mullite, fused zirconia, sintered zirconia mullite, fused zirconia mullite, sintered magnesia, fused magnesia, sintered spinel, and fused spinel refractory grog. A combination of dense refractory aggregates may be used to achieve particular results.

Typically, the particle size of the dense refractory aggregates will be greater than 100 mesh. Dense refractory aggregate may be present in an amount from about 0 to 80 volume percent, preferably about 0 to 40 volume percent.

The composition of the dense refractory and matrix material may be identical, with the same refractory material performing the functions of providing the refractory body or skeleton and enhancing performance of the composition in the service environment. The larger particles, typically greater than about 100 mesh, function primarily as dense refractory aggregate that enhances the structural integrity of the composition and the smaller particles, typically less than about 100 mesh, more preferably less than about 65 mesh, function primarily as matrix material that provides good resistance to the chemical and thermal environment in which the composition will be used. Particles in the range of about 100 mesh may exhibit a secondary function in addition to their primary function; i.e., certain dense refractory aggregate particles in this size range may enhance chemical and thermal resistance and certain matrix material particles in this size range may enhance structural integrity.

As described above, the refractory composition may comprise the following ingredients in approximate percent by volume:

| Ingredient | Percent by Volume |
| --- | --- |
| filler lightweight material | 15 to 85 |
| matrix material | 5 to 50 |
| heat activated bonding agent | 0 to 15 |
| dense refractory aggregate | 0 to 80 |
| dust suppressant | 0 to 3. |

More preferably, the composition comprises the following ingredients in approximate percent by volume:

| Ingredient | Percent by Volume |
| --- | --- |
| filler lightweight material | 50 to 80 |
| matrix material | 10 to 30 |
| heat activated bonding agent | 0 to 10 |
| dense refractory aggregate | 0 to 40 |
| dust suppressant | 0.25 to 1.6. |

Preferably the density and conductivity of the composition are at least about 80 percent (more preferably about 75 percent) of the density and conductivity of a non-lightweight refractory composition with the same chemistry. Typically, the installed density of the composition is less than about 140 pounds per cubic foot although this may vary depending on the chemistry of the composition, particularly the type of filler lightweight material.

The composition also may include a small amount of a dust suppressant. The dust suppressant functions primarily to reduce visible dust to keep the installation environment clean and facilitate use. It also functions to maintain the airborne respirable dust levels of the materials in the composition below their respective exposure limits, although respirable dust particles tend to stick to larger visible dust particles when visible dust is present. A dust suppressant generally is necessary in compositions to be installed under conditions likely to result in generation of large quantities of dust, particularly large-scale installations and those without dust control ventilation systems. The dust suppressant is not necessary to satisfactorily contain either heat or molten metal and slag, so the dust suppressant may be omitted in other applications.

Lightweight oil, such as mineral oil, in an amount from about 0.1 to 3 volume percent, preferably about 0.25 to 1.6 volume percent, is a preferred dust suppressant. The lighter the weight of the oil, the larger the quantity of dust suppressant likely to be needed to achieve satisfactory results. Other substances that reduce dusting without interfering with refractory performance, such as other lightweight oils, kerosene, a mixture of lightweight oil and kerosene, and viscous organic polymers (preferably nonaqueous formulations), also may be used.

The refractory composition contains no added moisture or liquid chemical binders. The composition is not moisture bearing in its as-installed state. It is expected that the refractory composition as installed will contain less than about 0.5 weight percent water resulting from waters of hydration associated with refractory constituents and/or moisture absorbed from the environment, although this amount may vary with the specific refractory composition and environmental conditions during storage and installation.

The dry refractory composition of the present invention may be prepared by combining commercially available raw materials (preselected for the desired particle sizes) in a mixer. The particles are mixed together to provide a substantially continuous distribution. The mixing process is similar to known methods of making dry vibratable refractories. A dust suppressant may be added to the composition during mixing. An atomized dust suppressant also could be sprayed into the composition.

The refractory composition may be installed by pouring it into place and then de-airing or densifying it. This may be accomplished by compacting the composition in place, for example, by vibration or ramming. For denser compositions, de-airing also may be accomplished by forking the composition (using a forking tool or similar apparatus) to remove air entrained in the composition during pouring. The removal of entrained air brings the particles into better contact with one another and provides particle packing sufficient to allow formation of strong bonds and the development of load bearing capability in the bonded refractory. Even workers without special skills or experience easily can install this composition.

Before operating a newly lined or repaired vessel, the temperature of the lining may be increased gradually toward the operating temperature. During this heat-up period, many desirable and consequential chemical and physical reactions may take place in the lining. The increasing temperature of the lining may initiate or accelerate these reactions, including activation of heat activated bonding agents. Because no water or liquid chemical binders are present in an installed dry refractory lining of the present invention, no prolonged drying step is needed between installation and heat-up.

A refractory composition of the present invention is designed or selected for a particular application based upon the thermal environment of the vessel and the chemical and metallurgical reactions to be carried out in the vessel. For example, a dry refractory used for molten metal containment applications must be resistant to the temperatures and types of metal(s) and slag(s) inherent to the metallurgical or other process.

Conventional thermal analysis and lining design techniques are used to develop a thermal profile of the vessel based upon these factors. Materials are selected based on this profile and desired operating conditions (including, but not limited to, insulating value, campaign time, ease of repair and material costs). Generally, materials are selected for the refractory composition such that the composition can tolerate the thermal environment of the vessel and maintain the structural integrity of any shell surrounding the vessel while providing superior insulating value.

For insulating or heat containment applications, the refractory composition may be a very lightweight formulation that minimizes heat loss. The composition may include a quantity of filler lightweight material sufficient to obtain the desired thermal behavior combined with a sufficient quantity of bonding agents and matrix material to bond the filler lightweight material together. The composition of the present invention competes effectively in these applications with insulating brick and castables. Installation of the dry refractory composition is faster and less labor intensive than installation of refractory bricks or castables and no prolonged drying time is required to drive out the moisture present in castable refractory.

For applications in which both heat and molten metal containment is desired, filler lightweight material may displace the preferred dense refractory aggregate(s) present in conventional refractory materials suitable for containment of a particular metal until the metal containment ability of the resulting refractory begins to deteriorate. Matrix material to improve the characteristics of the composition by bridging between dense aggregate and the bonding phase are added. A quantity of bonding agents sufficient to cause bonding of the composition also may be added. Compositions with metal and heat containment capabilities generally have less insulating value than compositions intended primarily or exclusively for heat containment applications because a greater amount of dense refractory aggregate generally is necessary to provide sufficient resistance to the corrosive effects of molten metals.

The dry refractory may be selected with an appropriate sintering temperature range that will allow the formation of strong ceramic bonds in the entire refractory body or a predetermined region thereof. Some refractories of the present invention are designed so that extensive heat activated bonding occurs at temperatures as low as about 350° F. These refractories form a rigid mass. Other refractories of the present invention have heat activated bonding agents that develop progressive bonds. After installation, these refractories will progressively bond in response to exposure to heat, such that the regions adjacent to the heat source (e.g., a hot face of a process vessel or an intrusion of molten metal and slag into the refractory) will form strong ceramic bonds, the regions furthest from the heat source will remain in an unbonded fluid state until the temperature in these regions exceeds the activation temperature of the bonding agents, and the intermediate region& will undergo partial bonding. The region of unbonded fluid refractory increases the ability of the installed refractory to absorb mechanical stresses, such as those associated with heat-related expansion and contraction.

EXAMPLE 1

An insulating dry refractory composition for heat containment in a "ring" furnace used in baking carbon anode for aluminum reduction cell operation was prepared. A ring furnace typically has a series of sections of refractory lined flues and carbon anode baking pits, which usually are about 10 to 15 feet below ground level. The flue wall temperature generally ranges from about 2100° F. to 2350° F. A concrete superstructure generally contains the exterior flue walls. An insulating brick or insulating castable secondary lining typically is used to reduce heat loss and to protect the concrete from deterioration caused by from extended heat exposure. The composition is suitable for use in a ring furnace instead of insulating fireclay brick or insulating castable The insulating dry refractory composition was prepared with the following ingredients of the approximate particle sizes listed in approximate percent by volume:

| Ingredient | Percent by Volume |
| --- | --- |
| calcined flint clay, −4 mesh | 12.8 |
| sillimanite group mineral, −35 mesh | 4.8 |
| pyrophyllite, −16 mesh | 3.0 |
| perlite, −10 mesh | 77.0 |
| fireclay, −100 mesh | 1.0 |
| refractory frit, −100 mesh | 0.9 |
| mineral oil | 0.5. |

The composition meets the maximum service temperature limit of 2450° F., has a compacted density of only 65 pounds per cubic foot, and has an insulating value in the range of about 1.0 BTU-in/° F.-hr-ft$^2$ from about 400° F. to 1500° F. The composition provides insulating value equal or better to insulating brick and insulating castables and is simpler, faster, and less expensive to install to a ring furnace.

EXAMPLE 2

An insulating dry refractory composition for molten metal/slag and heat containment in a steel ladle was prepared. Steel ladles must be able to withstand high temperatures and corrosion from molten metal and slag. They also must have acceptable heat loss during tapping. Steel ladles typically have a high alumina or basic refractory working lining and a super duty brick, castable, or conventional dense dry vibratable refractory secondary lining. The secondary lining ideally provides resistance to molten metal and slag in case of a breakout of the working lining, thermal and mechanical stress relief of the working lining and high insulating value. Because the ladles can have a tapping temperature of 3050 ° F. or more and tapping times have been increasing, the demands on refractory performance are high. Super duty bricks and castables offer good metal and slag containment but poor stress relief and insulating value. Dense dry vibratable refractories offer good metal containment and stress relief but less than ideal insulating value. The composition is suitable for use as a secondary lining in a steel ladle instead of super duty brick, castable, or conventional dense dry vibratable refractory.

The insulating dry refractory composition was prepared with the following ingredients of the approximate particle sizes listed in approximate percent by volume:

| Ingredient | Percent by Volume |
| --- | --- |
| alumina/spinel insulating aggregate (lightweight grain, −⅜") | 72.6 |
| sintered magnesia, −100 mesh | 3.5 |
| fused alumina, −50 mesh | 10.6 |
| calcined alumina, −200 mesh | 10.4 |
| refractory frit, −100 mesh | 1.3 |

| Ingredient | Percent by Volume |
| --- | --- |
| mineral oil | 1.6. |

The composition contains about 85 volume percent alumina and about 10 volume percent magnesia but has a density of only about 100 pounds per cubic foot. The composition was subjected to a conventional laboratory iron compatibility cup test at 2850° F. for four hours and showed no metal penetration. The insulating value of the composition is in the range of about 6 to 9 BTU-in/° F.-hr-ft$^2$ from about 800° F. to 1800° F. The composition is expected to provide performance superior to super duty brick, castables, and conventional dense dry vibratable refractories when used as a secondary lining in a steel ladle because it offers good resistance molten metal and slag, good thermal and mechanical stress relief of the working lining, and high insulating value.

Throughout this specification, when a range of conditions or a group of substances is defined with respect to a particular characteristic (e.g., temperature, volume percent and the like) of the present invention, the present invention relates to and explicitly incorporates every specific member and combination of subranges or subgroups therein. Any specified range or group is to be understood as a shorthand way of referring to every member of a range or group individually as well as every possible subrange and subgroup encompassed therein; and similarly with respect to any subranges or subgroups therein.

Although a specific embodiment of the invention has been described herein in detail, it is understood that variations may be made thereto by those skilled in the art without departing from the spirit of the invention or the scope of the appended claims.

What is claimed is:

1. A dry refractory composition, comprising:
   an insulating refractory material consisting essentially of:
   a matrix material having a particle size less than 100 mesh in an amount from 5 to 50 volume percent, the matrix material being selected from calcined alumina, fused alumina, sintered magnesia, fused magnesia, silica fume, fused silica, silicon carbide, boron carbide, titanium diboride, zirconium boride, boron nitride, aluminum nitride, silicon nitride, Sialon, titanium oxide, barium sulfate, zircon, a sillimanite group mineral, pyrophyllite, fireclay, calcium fluoride, and mixtures thereof;
   a dense refractory aggregate having a particle size greater than or equal to 100 mesh in an amount from 0.1 to 80 volume percent, the dense refractory aggregate being selected from calcined fireclay, calcined Chamotte, a sillimanite group mineral, calcined bauxite, pyrophyllite, silica, zircon, baddeleyite, cordierite, silicon carbide, sintered alumina, fused alumina, fused silica, sintered mullite, fused mullite, fused zirconia, sintered zirconia mullite, fused zirconia mullite, sintered magnesia, sintered spinel, fused spinel refractory grog, and mixtures thereof; and
   a filler lightweight material having a particle size less than or equal to ⅜ inch in an amount from 15 to 85 volume percent, the filler lightweight material being selected from perlite, vermiculite, expanded shale, expanded fireclay, expanded alumina silica hollow spheres, bubble alumina sintered porous alumina, alumina spinel insulating aggregate, calcium alumina insulating aggregate, expanded mullite, cordierite, anorthite, insulating refractory material, and mixtures thereof;

the matrix material, dense refractory aggregate, and lightweight filler material being selected so that when the refractory composition in installed in powder form without addition of water or liquid chemical binders in a void adjacent to a heat source, a portion of the composition nearer the heat source forms strong ceramic bonds and a portion of the composition further from the heat source remains in an unbonded fluid form.

2. The dry refractory composition of claim 1, wherein the filler lightweight material is present in an amount from 50 to 80 volume percent.

3. The dry refractory composition of claim 1, further comprising:

a heat activated bonding agent in an amount from 0.1 to 15 volume percent, the heat activated bonding agent being selected from boron oxide, boric acid, cryolite, a noncalcium fluoride salt, a silicate compound, a phosphate compound, calcium silicate cement, calcium aluminate cement, fluorspar, magnesium chloride, ball clay, kaolin, refractory frit, phenolic resin, furan resin, pitch, and mixtures thereof, the heat activated bonding agent promoting bonding of the matrix material, dense refractory aggregate, and filler lightweight material in an installed composition.

4. The dry refractory composition of claim 3, wherein the matrix material is present in an amount from 10 to 30 volume percent, the dense refractory aggregate is present in an amount from 0.1 to 40 volume percent, the filler lightweight material is present in an amount from 50 to 80 volume percent, and the heat activated bonding agent is present in an amount from 0.1 to 10 volume percent.

5. The dry refractory composition of claim 1, further comprising;

a dust suppressant in an amount sufficient to control visible and respirable dust during installation of the composition.

6. The dry refractory composition of claim 5, wherein the dust suppressant is selected from a lightweight oil, kerosene and an organic polymer.

7. An installed refractory composition, comprising:

an insulating refractory composition consisting essentially of:

a matrix material having a particle size less than 100 mesh in an amount from 5 to 50 volume percent, the matrix material being selected from calcined alumina, fused alumina, sintered magnesia, fused magnesia, silica fume, fused silica, silicon carbide, boron carbide, titanium diboride, zirconium boride, boron nitride, aluminum nitride, silicon nitride, Sialon, titanium oxide, barium sulfate, zircon, a sillimanite group mineral, pyrophyllite, fireclay, calcium fluoride, and mixtures thereof;

a dense refractory aggregate having a particle size greater than or equal to 100 mesh in an amount from 0.1 to 80 volume percent, the dense refractory aggregate being selected from calcined fireclay, calcined Chamotte, a sillimanite group mineral, calcined bauxite, pyrophyllite, silica, zircon, baddeleyite, cordierite, silicon carbide, sintered alumina, fused alumina, fused silica, sintered mullite, fused mullite, fused zirconia, sintered zirconia mullite, fused zirconia mullite, sintered magnesia sintered spinel, fused spinel refractory grog, and mixtures thereof; and a filler lightweight material having a particle size less than or equal to ⅜ inch in an amount from 15 to 85 volume percent, the filler lightweight material being selected from perlite, vermiculite, expanded shale, expanded fireclay, expanded alumina silica hollow spheres, bubble alumina, sintered porous alumina, alumina spinel insulating aggregate, calcium alumina insulating aggregate, expanded mullite, cordierite, anorthite, insulating refractory material, and mixtures thereof;

the matrix material, dense refractory aggregate, and lightweight filler material selected so that when the insulating refractory composition is installed in powder form without addition of water or liquid chemical binders in a void adjacent to a heat source, a portion of the composition nearer the heat source forms strong ceramic bonds and a portion of the composition further from the heat source remains in an unbonded fluid form.

8. The installed refractory composition of claim 7, wherein the unbonded fluid portion of the composition is capable of relieving mechanical stresses in the installed refractory.

9. The installed refractory composition of claim 7, further comprising:

a heat activated bonding agent in an amount from 0.1 to 15 volume percent, the heat activated bonding agent being selected from boron oxide, boric acid, cryolite, a noncalcium fluoride salt, a silicate compound, a phosphate compound, calcium silicate cement, calcium alumina cement, fluorspar, magnesium chloride, ball clay, kaolin, refractory frit, phenolic resin, furan resin, pitch, and mixtures thereof, the heat activated bonding agent promoting bonding of the matrix material, dense refractory aggregate, and filler lightweight material in the installed composition.

10. A method of making a refractory composition, comprising:

selecting a matrix material having a particle size less than 100 mesh in an amount from 5 to 50 volume percent from calcined alumina, fused alumina, sintered magnesia, fused magnesia, silica fume, fused silica, silicon carbide, boron carbide, titanium diboride, zirconium boride, boron nitride, aluminum nitride, silicon nitride, Sialon, titanium oxide, barium sulfate, zircon, a sillimanite group mineral, pyrophyllite, fireclay, calcium fluoride, and mixtures thereof;

selecting a dense refractory aggregate having a particle size less than or equal to 100 mesh in an amount from 0.1 to 80 volume percent, the dense refractory aggregate being selected from calcined fireclay, calcined Chamotte, a sillimanite group mineral, calcined bauxite, pyrophyllite, silica, zircon, baddeleyite, cordierite, silicon carbide, sintered alumina, fused alumina, fused silica, sintered mullite, fused mullite, fused zirconia, sintered zirconia mullite, fused zirconia mullite, sintered magnesia, sintered spinel, fuse spinel refractory grog, and mixtures thereof; and selecting a filler lightweight material having a particle size less than or equal to ⅜ inch in an amount from 15 to 85 volume percent from perlite, vermiculite, expand shale, expanded fireclay, expanded alumina silica hollow spheres, bubble alumina, sintered porous alumina, alumina spinel insulating aggregate, calcium alumina insulating aggregate, expanded mullite, cordierite, anorthite, insulating refractory material, and mixtures thereof; and blending the matrix material, dense refractory aggregate, and filler lightweight material in the absence of added water or liquid chemical binders;

the matrix material, dense refractory aggregate, and filler lightweight material being selected so that when the blended composition is installed in powder form adjacent to a heat source, a portion of the composition nearer the heat source forms strong ceramic bonds and a portion of the composition further from the heat source remains in an unbonded fluid form.

11. The method of claim 10, further comprising the steps of:

selecting a heat activated bonding agent in an amount from 0.1 to 15 volume percent from boron oxide, boric acid, cryolite, a noncalcium fluoride salt, a silicate compound, a phosphate compound, calcium silicate cement, calcium aluminate cement, fluorspar, magnesium chloride, ball clay, kaolin, refractory frit, phenolic resin, furan resin, pitch, and mixtures thereof; and blending the heat activated bonding agent with the matrix material, dense refractory aggregate, and filler lightweight material.

12. The method of claim 10, further comprising the steps of:

selecting a dust suppressant; and adding the dust suppressant to the composition in an amount sufficient to control visible and respirable dust during installation of the composition.

13. A method of installing an insulating refractory lining, comprising the steps of:

selecting an insulating refractory composition in powder form, the composition consisting essentially of:

a matrix material having a particle size less than 100 mesh in an amount from 5 to 50 volume percent, the matrix material being selected from calcined alumina, fused alumina, sintered magnesia, fused magnesia silica fume, fused silica, silicon carbide, boron carbide, titanium diboride, zirconium boride, boron nitride, aluminum nitride, silicon nitride, Sialon, titanium oxide, barium sulfate, zircon, a sillimanite group mineral, pyrophyllite, fireclay, calcium fluoride, and mixtures thereof;

a dense refractory aggregate having a particle size greater than or equal to 100 mesh in an amount from 0.1 to 80 volume percent, the dense refractory aggregate being selected from calcined fireclay, calcined Chamotte, a sillimanite group mineral, calcined bauxite, pyrophyllite, silica, zircon, baddeleyite, cordierite, silicon carbide, sintered alumina, fused alumina, fused silica, sintered mullite, fused mullite, fused zirconia, sintered zirconia mullite, fused zirconia mullite, sintered magnesia, sintered spinel, fused spinel refractory grog, and mixtures thereof; and a filler lightweight material having a particle size less than or equal to 3/8 inch in an amount from 15 to 85 volume percent, the filler lightweight material being selected from perlite, vermiculite, expanded shale, expanded fireclay, expanded alumina silica hollow spheres, bubble alumina, sintered porous alumina, alumina spinel insulating aggregate, calcium alumina insulating aggregate, expanded mullite, cordierite, anorthite, insulating refractory material, and mixtures thereof;

pouring the composition in powder form into a void adjacent to a heat source; and de-airing the poured composition; and heating the de-aired composition such that a portion of the composition nearer the heat source forms strong ceramic bonds and a portion of the composition further from the heat source remains in an unbonded fluid form.

14. The method of claim 13, wherein the de-airing step comprises compacting the composition.

15. The method of claim 13, further comprising the steps of;

selecting a heat activated bonding agent in an amount from 0.1 to 15 volume percent from boron oxide, boric acid, cryolite, a noncalcium fluoride salt, a silicate compound, a phosphate compound, calcium silicate cement, calcium aluminate cement, fluorspar, magnesium chloride, ball clay, kaolin, refractory frit, phenolic resin, furan resin, pitch, and mixtures thereof;

blending the heat activated bonding agent with the composition; and promoting bonding of the composition by heating the installed composition.

16. The method of claim 13, further comprising the steps of:

selecting a dust suppressant; and blending the dust suppressant with the composition in an amount sufficient to control visible and respirable dust during installation of the composition.

17. A dry refractory composition, comprising:

an insulating refractory composition consisting essentially of a matrix material comprising fireclay having a particle size of minus 100 mesh in an amount of 1.0 volume percent;

a dense refractory aggregate comprising a sillimanite group mineral having a particle size of minus 35 mesh in an amount of 4.8 volume percent; calcined flint clay having a particle size of minus 4 mesh in an amount of 12.8 volume percent, and pyrophyllite having a particle size of minus 16 mesh in an amount of 3 volume percent;

a filler lightweight material comprising perlite having a particle size of minus 10 mesh in an amount of 77 volume percent;

a heat activated bonding agent comprising refractory frit having a particle size of minus 100 mesh; and a dust suppressant comprising mineral oil.

18. A refractory composition, comprising:

an insulating refractory composition consisting essentially of:

a matrix material comprising sintered magnesia having a particle size of minus 100 mesh in an amount of 3.5 volume percent and calcined alumina having a particle size of minus 200 mesh in an amount of 10.4 volume percent;

a dense refractory aggregate comprising fused alumina having a particle size of minus 50 mesh in an amount of 10.6 volume percent;

a filler lightweight material comprising alumina/spinel insulating aggregate having a particle size of minus 3/8 inch in an amount of 72.6 volume percent;

a heat activated bonding agent comprising refractory frit having a particle size of minus 100 mesh; and a dust suppressant comprising mineral oil.

* * * * *